May 22, 1951
L. FINKELSTEIN
2,553,568
INCENDIARY FILLING FOR BOMBS
Filed Feb. 25, 1943
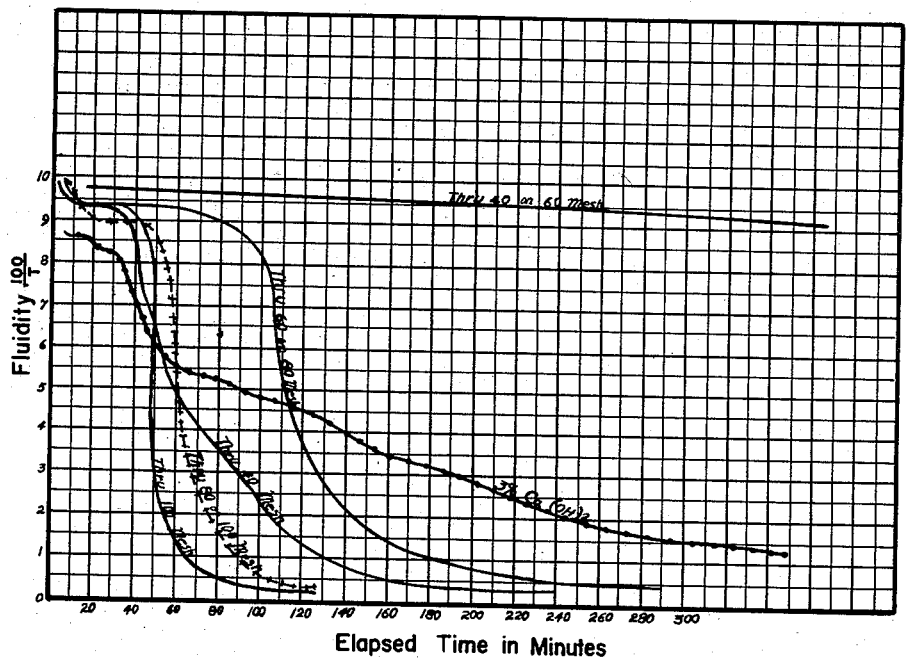
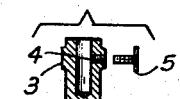
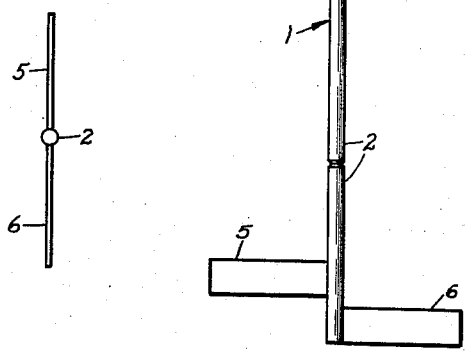
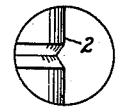
Inventor
LEO FINKELSTEIN
By Joseph A. O'Connell
Fred S. Lockwood
Attorneys Patented May 22, 1951

2,553,568

UNITED STATES PATENT OFFICE 2,553,568

INCENDIARY FILLING FOR BOMBS

Leo Finkelstein, Perryman, Md., assignor to the United States of America as represented by the Secretary of War Application February 25, 1943, Serial No. 477,170

19 Claims. (Cl. 44—7)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to incendiary compositions of the gelled gasoline type.

Gelled gasoline is used in large quantities for the fillings of large sized incendiary bombs and related purposes. Initially, rubber was used as the standard gelling agent for thickening the gasoline. However, due to the present shortage of rubber by reason of war-time conditions and higher priorities, this material is no longer available for this purpose and other gelling agents must be used. Several gelled gasoline compositions have been proposed wherein materials other than rubber are used as thickening agents. However, to date, these compositions have not been satisfactory either because of poor quality or because of requiring difficultly available strategic materials.

Accordingly, a primary object of this invention is the provision of improved gelled gasoline incendiary compositions which do not require rubber or other difficultly obtainable substances.

Another object of the invention is the provision of gelled gasoline incendiary compositions and methods of preparing the same, whereby the time at which thickening or gelling thereof begins, and the rate of setting or gelling of which, may be controlled so as to permit convenient handling of large batches for filling incendiary bombs and munitions.

The gelled gasoline compositions of this invention are very stable at extreme cold and warm temperatures and have been found to function very satisfactorily as incendiary fillings.

Other objects of this invention will, in part, be obvious and will, in part, appear hereinafter.

Briefly stated, the invention comprises the use of an alkaline earth soap, such as calcium stearate or barium stearate in combination with a polymeric substance of high molecular weight, such as isobutyl methacrylate or isobutyl ethacrylate, to gel gasoline for incendiary fillings. Not only are the compositions of this invention themselves novel, but also forming part of the invention are certain steps and techniques of preparation whereby the time at which gelling or setting begins and the rate of gelling or setting, may be controlled, as will appear hereinafter. Normally, the compositions are prepared by adding to gasoline an organic polymer, a soap-forming fatty acid, an alkaline earth oxide or hydroxide, and water. The acid and alkaline earth oxide or hydroxide react to form the alkaline earth soap. By withholding the water from a batch, it has been found that the time at which setting or gelling of the composition begins may be controlled. Furthermore, it has been found that the mesh or particle size of the alkaline earth oxide or hydroxide has a very material effect upon the rate of thickening or gelling. By taking advantage of these novel features, it is possible to control the fluidity of batches so as to permit the convenient handling thereof in the filling plant.

For a more complete understanding of the material and scope of this invention, reference may be had to the following detailed description thereof, setting forth by way of illustration certain specific compositions and methods of preparation, taken in connection with the accompanying drawing, in which:

Fig. 1 contains a number of curves showing the effect of mesh or particle size of alkaline earth oxides or hydroxides on the rate of gelling or thickening of gasoline incendiary compositions;

Fig. 2 is a side elevational view with dimensions of a paddle used in a Stormer Viscosimeter for testing the viscosity of gelled gasoline, as will be explained hereinafter;

Fig. 3 is a bottom plan view with dimensions of the paddle shown in Fig. 2; and

Fig. 4 is an enlarged view with dimensions showing the details of the groove provided in the spindle of the paddle shown in Fig. 2.

In Figures 2 to 4 inclusive, there is shown a paddle 1 which is particularly adaptable for use in mixing and stirring the fatty acids, the basic hydroxides and the gasoline together in making the composition of this invention. This paddle includes a central shaft 2 which is, preferably at its upper-end portion 3, provided with an elongated recessed portion 4 and a knurled screw 5 whereby the shaft is adapted to be operatively connected to the driving shaft of any suitable rotary mixer, blender or viscometer (not shown).

At its lower portion, the shaft 2 is provided with two vertically offset and oppositely extending paddles 5, 6, which, by reason of their being vertically offset not only serve to provide a more thorough mixture but also tend to prevent the shaft 2 from being forced out of vertical alignment beneath the mixer or viscometer, while the mixture is being stirred.

The two following specific examples of compositions made according to this invention will serve to illustrate the nature thereof:

Example I

Composition: Percent by weight
Stearic acid _____ 3.0 ± 0.8
Isobutyl methacrylate polymer
  AE _____ 5.0 ± 0.2
Calcium oxide _____ 2.0 ± 0.3
Gasoline _____ 88.75 ± 0.5
Water _____ 1.25 ± 0.1

The composition is prepared by first dissolving the stearic acid in gasoline, after which the temperature of the gasoline solution of stearic acid may be adjusted to about 26° C., and with stirring the isobutyl methacrylate is added to the gasoline-stearic acid mixture and agitation continued until the polymer is entirely in solution. The calcium oxide is next added to the mixture with stirring until this compound has been entirely incorporated, and then the water is added with stirring. It has been found that a good gel can be made regardless of the order in which the fatty acid, polymer and alkaline oxide are incorporated in the gasoline. However, from the standpoint of plant procedure the method outlined is presently preferred, as will appear hereinafter.

With respect to the grades and types of ingredients used in the above composition, the following materials have been found to be satisfactory, although, it is not intended that the invention be limited thereto. Stearic acid having not more than a light brownish color, containing more than 0.10% of material insoluble in ether, with a setting point not less than 54° C., not containing more than a trace of indecomposed fats or paraffins, not containing more than a trace of mineral acids, and having a particle size whereby a minimum of 99% passes through No. 30 U. S. Standard sieve and a minimum of 50% passes through a No. 100 U. S. Standard sieve, has been found to be satisfactory. Isobutyl methacrylate polymer of the high molecular weight type designated in the trade as "AE" which is soluble in gasoline and has a degree of fineness such that 100 percent passes through a No. 10 U. S. Standard sieve, has been found to be satisfactory. Ordinary motor gasoline, free from water and suspended materials and suitable for use as fuel in internal combustion engines, adequately meets requirements. Calcium oxide of a screened "pebble" grained, technical grade, passing 40-mesh U. S. Standard sieve, and containing a minimum of 95% CaO, is satisfactory.

In connection with the preparation of the above composition, it has been found that the separate use of the alkaline earth oxide and water is advantageous in certain instances, since the mixture will not thicken until the water is added. Accordingly, this feature allows the mixing and holding of a batch containing all components except water until such time as it is desired to thicken the same. From the standpoint of plant practice this is a highly desirable feature of the invention.

It has also been found, as will be explained in detail hereinafter, that the particle size of the calcium oxide has a very material effect on the rate of thickening or gelling of the composition.

Example II

Composition: Percent by weight
- Isobutyl methacrylate _____ 5.0
- Stearic acid _____ 4.0
- Barium hydroxide.8H$_2$O _____ 4.4
- Gasoline _____ 86.6

This composition may be prepared by first dissolving the stearic acid in the gasoline and then slowly adding the polymer to the gasoline solution with continuous stirring. Next, the barium oxide of 40–60 mesh U. S. Standard sieve 1 is slowly added to the mixture with continuous stirring. The gel begins to thicken but immediately after the addition of the barium hydroxide, a slurry-like materal is formed which can be readily poured or pumped into bombs or other containers. In about 24 hours the mixture will have become highly elastic, tenacious, and adhesive. Normally, in about 48 hours the gel is ready for use. If the material is stirred vigorously with a paddle, the gellation may be brought about in about 5 minutes.

In respect to permissible substitution of materials and ingredients in the above compositions, it has been found that any alkaline earth oxide or hydroxide may generally be used interchangeably with the other members of this class. Of course, if it is desired to withhold the water component so as to delay the time of setting, the oxide and not the hydroxide should be used. Calcium hydroxide is presently preferred, however, due to its greater stability in storage.

The isobutyl methacrylate polymer may be replaced with other polymeric substances, of high molecular weight and soluble in gasoline, to increase the viscosity thereof, such as isobutyl ethacrylate and rubber. Of course, as mentioned above, rubber is not presently available for use in these compositions, but when the same becomes available, it may be used with certain of the advantages provided by this invention.

The stearic acid may be replaced with other soap-forming fatty acids.

It has been found that the gelled gasoline incendiary compositions of this invention will be satisfactory if they meet the following specifications:

a. Not more than 6% of the gasoline should separate when the material is allowed to stand at −40° F. for 4 hours.

b. No separation of gasoline shall take place when the material is allowed to stand at 125° F. for 48 hours.

c. The viscosity of the material, taken 48 hours after manufacture and storage at 25° C., should not be less than 400 seconds and not more than 700 seconds for 100 revolutions of the counter as measured on a Stormer viscosimeter, at 25° C. using a stirring paddle of the design shown in Figures 2, 3, and 4 of the drawing, under a load of 500 grams.

Reference may now be had to Fig. 1, the curves of which show the effect of particle or mesh size of the alkaline earth oxide or hydroxide on the rate of setting or gelling of the incendiary composition. Although the curves in Fig. 1 are limited to the effect of mesh size of calcium oxide, it will be understood that, in general, the same effects hold for other alkaline earth oxides or hydroxides.

It will be noted that the y-axis of the graph is graduated in terms of "fluidity," which is the reciprocal of viscosity, while the x-axis is scaled in elapsed time in minutes. The legends on each of the six curves shown in Fig. 1 make the same clear. It will be seen that calcium oxide passing through 100 mesh sets the gel in the shortest time. Calcium oxide passing through 80 on 100 mesh, through 60 on 80 mesh, and through 40 on 60 mesh, set the gel in progressively decreasing rates. The great decrease in rate of setting when calcium oxide of through 40 on 60 mesh is used is particularly noticeable. The graph only covers the period of 5 hours, but it will be seen that when material having a particle size of through 40 on 60 mesh is used, only a slight decrease in fluidity, or increase in viscosity, of the gel occurs.

Since certain further changes and modifications may be made in the foregoing illustrative compositions, materials, methods, and procedures for and of practicing the invention, without departing from the scope thereof, it is intended that all matter described hereinabove shall be interpreted as illustrative and not in a limiting sense.

I claim as my invention:

1. A gel-type incendiary composition comprising a relatively large proportion of gasoline, and relatively small proportions of barium soap, isobutyl methacrylate polymer, and water.

2. An incendiary liquid which is substantially water free and consists essentially of about 88.7 to about 88.8 parts by weight of gasoline, from about 2.2 to about 3.8 parts by weight of stearic acid, from about 4.8 to about 5.2 parts by weight of isobutyl methacrylate polymer of the higher molecular weight type, and from about 1.7 to about 2.3 parts by weight of calcium oxide; said liquid being substantially soap free, substantially water free and having the characteristic of becoming thickened when water is mixed herewith.

3. A gel-type incendiary composition comprising about 86.6 parts by weight of gasoline, about 4.0 parts by weight of stearic acid, about 5.0 parts by weight of isobutyl methacrylate polymer, and about 4.4 parts by weight of hydrated barium hydroxide.

4. The method of gelling gasoline which comprises adding thereto isobutyl methacrylate polymer and barium stearate soap.

5. In the preparation of a gel-type incendiary composition comprising a relatively large proportion of gasoline, and relatively small proportions of stearic acid, isobutyl methacrylate polymer, compounds of the group consisting of barium oxide and hydroxide, and water, the step of controlling the rate of thickening of the composition by using said oxides and hydroxides of predetermined particle size.

6. The method of gelling gasoline to form a gel-type incendiary composition which comprises dissolving stearic acid in the gasoline, dissolving isobutyl methacrylate polymer in the gasoline-stearic acid mixture, adding barium oxide to the mixture, and lastly adding water to the mixture when it is desired to thicken the same.

7. In the preparation of a gel-type incendiary composition comprising a relatively large proportion of gasoline, and relatively small proportions of isobutyl methacrylate polymer, barium stearate soap, and water, the step of delaying the thickening of the composition by withholding said water component until thickening is desired.

8. The method of gelling gasoline to form a gel-type incendiary composition which comprises dissolving about 4.0 parts by weight of stearic acid in about 86.6 parts by weight of gasoline, dissolving about 5.0 parts by weight of isobutyl methacrylate polymer in the gasoline-stearic acid mixture, and adding to the mixture about 4.4 parts by weight of hydrated barium hydroxide having a particle size of about 40-60 mesh.

9. The method of gelling gasoline to form a gel-type incendiary composition which consists essentially in stirring and dissolving from about 2.2 to about 3.8 parts by weight of stearic acid in from about 88.7 to about 88.8 parts by weight of gasoline, adjusting the temperature of the gasoline-stearic acid solution to about 26° C., dissolving from about 4.8 to about 5.2 parts by weight of isobutyl methacrylate polymer of the higher molecular weight type in the gasoline-stearic acid solution, adding from about 1.7 to about 2.3 parts by weight of calcium oxide having a particle size passing 40 mesh to the mixture, and lastly adding from about 1.15 to about 1.35 parts by weight of water to the mixture.

10. A substantially water free liquid adapted to slowly gel in a single day when water is added thereto, into a tough adherent viscous mass difficultly removable from pumps, pipes and containers, said composition consisting essentially, by weight, of from about 85 to 95 parts of gasoline, from 2 to 4 parts of stearic acid, from about 4.5 to 5.5 parts of an isobutyl methacrylate polymer, and from about 1.5 to 2.5 parts of calcium oxide particles, said liquid being substantially water free, substantially soap free and having the characteristic of becoming thickened upon the addition of water thereto.

11. An incendiary liquid adapted to gel when water is intimately admixed therewith, said liquid being substantially water free and soap free and consisting essentially of, by weight from about 75 to 95 parts of gasoline, from about 2 to 4 parts stearic acid, from about 4.5 to 5.5 parts isobutyl methacrylate and from about 1.5 to 2.5 parts of calcium oxide particles having a size about 40 to 60 mesh.

12. An incendiary type liquid adapted to gel when from about 1 to about 3 percent of water is intimately admixed therewith, said liquid being substantially water free and substantially soap free and consisting essentially, by weight, of an intimate admixture of from about 85 to 95 parts of gasoline, from about 2 to 4 parts of stearic acid, from about 4.5 to 5.5 of isobutyl methacrylate, and from 1.5 to 2.5 parts of calcium oxide particles having a particle size of from about 60 to 80 mesh to about 60 to 40 mesh.

13. An incendiary type liquid adapted when intimately mixed with water to slowly gel in a single day into a tough adherent viscous mass difficultly removable from pumps, pipes and containers, said liquid being substantially water free and soap free and consisting essentially, by weight, of from about 85 to 95 parts of gasoline, from about 2 to 4 parts of stearic acid, from about 4.5 to 5.5 parts of a polymer selected from the group consisting of isobutyl methacrylate and isobutyl ethacrylate, and from about 1.5 to 2.5 parts of calcium oxide particles of approximately 40 to 60 mesh.

14. An incendiary liquid adapted to gel when water is intimately admixed therewith, said liquid being substantially water free and soap free and consisting essentially, by weight, of from about 85 to 95 parts of gasoline, from about 2 to 4 parts of stearic acid, from about 4.5 to 5.5 parts of a polymer selected from the group consisting of isobutyl methacrylate and isobutyl ethacrylate and from about 1.5 to 2.5 parts of calcium oxide particles.

15. A method of making a substantially water free and soap free liquid of a type adapted to gel when water is added thereto and intimately admixed therewith, said method consisting essentially in dissolving from about 2 to about 4 parts, by weight, of stearic acid in from about 70 to 90 parts, by weight, of gasoline at a temperature of about 26° C., dissolving from about 3 to 5.5 parts, by weight, of a polymer selected from the groups consisting of isobutyl methacrylate and isobutyl ethacrylate in the gasoline stearic acid solution and adding to said solution from about 1.5 to 2.5 parts, by weight, of comminuted calcium oxide particles to the mixture.

16. The method of making a substantially water free and soap free liquid of a type adapted to gel when water is added thereto and intimately admixed therewith, said method consisting essentially in dissolving from about 2 to about 4 parts, by weight, of stearic acid in from about 70 to 90 parts, by weight, of gasoline at a temperature of about 26° C., dissolving in the gasoline stearic solution from about 3 to 5.5 parts, by weight, of a polymer selected from the group consisting of isobutyl methacrylate and isobutyl ethacrylate in said solution and adding to the solution thus formed from about 1.5 to 2.5 parts, by weight of calcium oxide particles of such sizes as will pass through a 40 mesh screen.

17. The method of making a substantially water free and soap free liquid adapted to gel, said method consisting essentially in dissolving from about 2 to about 4 parts, by weight, of stearic acid in from about 70 to about 90 parts, by weight, of gasoline while adjusting the temperature of the gasoline stearic acid solution about 26° C., dissolving in said solution from about 3 to 5.5 parts, by weight, of a polymer selected from the groups consisting of isobutyl methacrylate and isobutyl ethacrylate in said solution and finally adding from about 1.5 to 2.5 parts, by weight, of calcium oxide particles of 40 to 60 mesh to the mixture.

18. The method of making a substantially water free and soap free liquid of a type adapted to gel when water is added thereto and intimately admixed therewith, said method consisting essentially in dissolving from about 2 to about 4 parts, by weight, of stearic acid in from about 70 to about 90 parts by weight, of gasoline while adjusting the gasoline stearic acid solution to a temperature of approximately 26° C., dissolving from about 3 to 5.5 parts, by weight, of isobutyl methacrylate in said solution and adding to the solution from about 1.5 to 2.5 parts, by weight, of calcium oxide particles to the mixture.

19. The method of making a substantially water free and soap free liquid of a type adapted to gel when water is added thereto and intimately admixed therewith, said method consisting essentially in dissolving from about 2 to about 4 parts, by weight, of gasoline while stirring the gasoline stearic acid solution at a temperature of about 26° C., dissolving from about 3. to 5.5 parts, by weight, of isobutyl ethacrylate in said solution and adding from about 1.5 to 2.5 parts, by weight, of calcium oxide crushed into small particles to the mixture.

LEO FINKELSTEIN.

REFERENCES CITED

The following references are of record in the file of this patent:

UNITED STATES PATENTS

| Number | Name | Date |
|---|---|---|
| 2,049,062 | Howard | July 28, 1936 |
| 2,096,218 | Voorhees | Oct. 19, 1937 |
| 2,274,673 | Earle | Mar. 3, 1942 |
| 2,312,725 | Morway et al. | Mar. 2, 1943 |
| 2,326,596 | Zimmer | Aug. 10, 1943 |
| 2,383,906 | Zimmer | Aug. 28, 1945 |
| 2,443,378 | Dittmar et al. | June 15, 1948 |

FOREIGN PATENTS

| Number | Country | Date |
|---|---|---|
| 964 | Great Britain | of 1892 |

OTHER REFERENCES

Klemgard: "Lubricating Greases," (1937), page 92.